United States Patent [19]

Maze et al.

[11] Patent Number: 5,229,214
[45] Date of Patent: Jul. 20, 1993

[54] PREPRIMED METAL SUBSTRATES FOR FORMED METAL APPLICATIONS

[75] Inventors: Etienne G. Maze, Breuil le Vert; Christine M. J. S. Tournillon, Belloy en France, both of France

[73] Assignee: Akzo N.V., Arnhem, Netherlands

[21] Appl. No.: 556,598

[22] Filed: Jul. 20, 1990

[30] Foreign Application Priority Data

Jul. 31, 1989 [EP] European Pat. Off. ........ 89201994.4

[51] Int. Cl.$^5$ .................... B32B 15/08; B32B 27/00; B21B 45/00
[52] U.S. Cl. ................. 428/458; 428/425.8; 428/423.3; 428/482; 72/46
[58] Field of Search ............ 428/458, 482, 425.8, 428/423.3; 72/46

[56] References Cited

U.S. PATENT DOCUMENTS

| | | |
|---|---|---|
| 4,205,115 | 5/1980 | Piccirilli et al. ............ 428/334 |
| 4,562,714 | 1/1986 | Tanaka et al. ............ 72/46 |
| 4,602,053 | 7/1986 | Huybrechts et al. ............ 523/436 |

FOREIGN PATENT DOCUMENTS

| | | |
|---|---|---|
| 0059136 | 9/1982 | European Pat. Off. . |
| 0070008 | 1/1983 | European Pat. Off. . |
| 0111986 | 6/1984 | European Pat. Off. . |
| 89201350.9 | 5/1989 | European Pat. Off. . |
| 8500375 | 1/1985 | PCT Int'l Appl. . |

OTHER PUBLICATIONS

Kirk-Othmer "Encyclopedia of Chemical Technology" by John Wiley & Sons, Third Edition, vol. 6, pp. 10-21.

Modern Surface Coatings by Paul Nylen and Edward Sunderland, Interscience Publishers, div. of John Wiley & Sons Ltd., pp. 7-9.

Modern Surface Coatings, a textbook of the chemistry and technology of paints, varnishes, and lacquers, "Types of Surface Coating", pp. 692-695, (Interscience, New York, 1965).

European Search Report for EPA No. 89201994.4.

*Primary Examiner*—Paul J. Thibodeau
*Assistant Examiner*—Leszek Kiliman
*Attorney, Agent, or Firm*—James K. Poole; Louis A. Morris

[57] ABSTRACT

The present invention relates to preprimed metal substrates suitable for use in formed metal applications. The preprimed metal substrate is coated with, as primer layer, (1) a first coating layer applied onto the metal substrate, the first coating layer being based upon a particular hydroxyl group-containing block copolymer, and (2) at least one flexible subsequent coating layer applied onto the first coating layer. The preprimed metal substrates are especially useful in automotive applications.

31 Claims, No Drawings

PREPRIMED METAL SUBSTRATES FOR FORMED METAL APPLICATIONS

BACKGROUND OF THE INVENTION

The present invention relates generally to preprimed metal substrates, such as sheets, which are suitable for formed metal applications, for example, the manufacture of automotive body parts for repair and/or on-line assembly.

In the usual formed metal applications, a metal sheet is first formed by well-known methods (drawing, die cutting, etc.) into the desired shape then subsequently coated with a primer (postpriming). The primer serves a number of well-known functions, including providing a barrier layer and/or corrosion protection layer for the underlying metal substrate.

Typical examples of primers for metal applications, such as automotive applications, include the following. U.S. Pat. No. 4,602,053 describes epoxyester linear block oligomers made with n−1 moles of fatty acid groups and n moles of epoxy oligomer, which are said to be particularly suited for chip-resistant coating compositions (preferably containing small pigment volume concentrations). See also EP-A-0179281.

WO 85/00375 discloses thermosetting coating compositions based upon an epoxy-polyester graft copolymer and a polyisocyanate crosslinker, which is said to be useful as a chip resistant primer for the automotive industry.

EP-A-0070008 describes zinc rich coatings having binders comprised of thermoplastic polyhydroxyethers, epoxy resins, epoxy ester resins, alkyl silicates, etc., which are useful for corrosion protection in the automotive industry. These coatings particularly contain aluminum trihydrate for improved combined spot welding/corrosion resistance properties on automotive components.

In automotive applications where the formed metals may take a number of odd or complex shapes, postpriming by normal on-line painting methods may result in a significant portion of the underlying metal substrate being unprimed or underprimed, as in the normal on-line painting methods it is difficult to adequately apply the primer in the various corners and other odd-shaped areas of the formed metal, particularly on both sides. In many instances, the various body parts are not primed until after assembly, thereby exacerbating the problem of unprimed or underprimed base metal. A common result is the early rusting and decreased life of the part.

It is, therefore, an object of the present invention to overcome this shortcoming by providing a preprimed metal substrate which may subsequently be formed into a shape suitable for use in automotive applications.

The general concept of preprimed metal substrates for formed metal applications is, of course, not new. Most primers suitable for use in automotive applications, however, are not suitable for preprimed formed metal applications, for example, because of either insufficient adhesion to the metal substrate or insufficient flexibility. In forming the preprimed metal substrate, particularly in the manner and degree necessary for automotive applications, insufficient adhesion can cause the primer to separate from the substrate, while insufficient flexibility can cause the primer to crack. Both can result, as indicated above, in the early rusting and decreased life of the part.

SUMMARY OF THE INVENTION

The present invention, therefore, provides a preprimed metal substrate comprising a metal substrate coated with a primer layer, wherein the primer layer comprises, in its overall concept:
(1) a first coating layer applied onto the metal substrate, the first coating layer comprising a coating composition based upon, as a binder, an hydroxyl groups-containing block copolymer built up from
  (A) one or more blocks of a carboxyl-terminated polyester resin and
  (B) one or more blocks of an epoxy resin; and
(2) at least one flexible subsequent coating layer applied onto the first coating layer.

The first coating layer should provide good adhesion to the substrate, be sufficiently flexible to be formed, and exhibit sufficient solvent resistance so that a second coating layer applied over the surface of the first coating layer will adhere to, but not substantially dissolve, the first coating layer.

It has been found that, to obtain good adhesion of the first coating layer to the substrate, the dry thickness of the first layer should not exceed about 15 $\mu$m. It has also been found that the overall coating thickness needs to be in the range of about 15 $\mu$m to about 45 $\mu$m to provide the desired final appearance for automotive applications and other applications where a glossy finish is desired, so it is necessary to apply at least a second coating layer.

The at least one subsequent coating layer should, in general, be a flexible material which exhibits stone chip resistance. It has been discovered that polyester polyols crosslinked with polyisocyanates and/or melamines adhere well to the first coating layer, provide good flexibility and possess excellent stone chip resistance.

The present invention also provides a method of prepriming a metal substrate, the method comprising the steps of:
(1) applying the aforementioned first coating layer onto a metal substrate, and
(2) applying the aforementioned at least one flexible subsequent coating layer onto the first coating layer.

The resulting preprimed metal substrates find particular use in formed metal applications which require deep draw capability during forming, such as the deep draw required in the automotive industry, and which require excellent stone chip resistance of the finished metal part.

These and other features and advantages of the present invention will be more readily understood by those skilled in the art from a reading of the following detailed description.

DETAILED DESCRIPTION OF THE PREFERRED EMBODIMENTS

As indicated previously, the present invention is related to preprimed metal substrates and, more particularly, to those suitable for use in applications wherein the preprimed substrate is subsequently formed into a shape.

Suitable metal substrates include a wide variety of pretreated or non-pretreated metals, including alloys, composites and the like comprising such metals. Particularly preferred are those normally utilized in the automobile industry, such as iron, galvanized iron, steel, galvanized steel and aluminum. For formed metal applications, of course, the metal substrate to be preprimed should substantially be in the physical form of a sheet.

These metal substrates are rendered suitable for formed metal applications by application of a particular primer layer prior to forming of the metal, hence the name "preprimed" metal. In accordance with the present invention, this primer layer comprises:

(1) a first coating layer applied onto the metal substrate, the first coating layer comprising a coating composition based upon, as a binder, an hydroxyl group-containing block copolymer built up from
 (A) one or more blocks of a carboxyl-terminated polyester resin and
 (B) one or more blocks of a epoxy resin; and
(2) at least one flexible subsequent coating layer applied onto the first coating layer.

As suitable hydroxyl group-containing block copolymers may be mentioned those described in EP-B-0111986 (U.S. patent application Ser. No. 07/334,747) and European Patent Application No. 89201350.9 (U.S. patent application Ser. No. 07/525,411), both of which are incorporated by reference herein for all purposes.

Briefly, the carboxyl-terminated polyester block (A) preferably comprises the polycondensation product of one or more dicarboxylic acids and one or more difunctional hydroxy compounds.

As suitable dicarboxylic acids may be mentioned aromatic dicarboxylic acids (EP-B-0111986), aliphatic dicarboxylic acids (European Patent Application No. 89201350.9) and mixtures thereof.

As examples of suitable aromatic dicarboxylic acids may be mentioned terephthalic acid and isophthalic acid.

As examples of suitable aliphatic dicarboxylic acids may be mentioned compounds of the general formula (I)

$$HOOC-R-COOH \tag{I}$$

wherein R is an aliphatic hydrocarbon group, preferably a (cyclo)aliphatic hydrocarbon group, and more preferably a linear alkyl group, having from 1 to 34 carbon atoms and preferably 1 to 12 carbon atoms. As specific examples of such may be mentioned malonic acid, succinic acid, glutaric acid, adipic acid, pimelic acid, suberic acid, azelaic acid, sebacic acid, dodecane dioic acid, dimeric fatty acids, trimethyl adipic acid, maleic acid and cyclohexane dicarboxylic acids. Especially preferred are adipic acid and sebacic acid.

At the time of application of the subsequent coating layer(s) over the first coating layer of the prepriming coating, it is desirable to have the second coating layer adhere to, but not substantially dissolve, the first coating layer. It has been found that use of the aromatic dicarboxylic acids is preferred for formation of the carboxyl-terminated polyester block, since the solvent resistance of the first coating layer is thereby increased making possible the use of a wider variety of second coating layer materials.

Suitable difunctional hydroxy compounds may be branched or unbranched, and may contain ether and/or ester linkages in their structures. As examples of such may be mentioned 1,2-propylene glycol, 1,3-propylene glycol, neopentyl glycol, 1,2-butane diol, 1,3-butane diol, 1,4-butane diol, 1,5-pentane diol, 1,6-hexane diol, polyalkylene glycols such as diethylene glycol, triethylene glycol and dipropylene glycol, trimethyl hexane diol, polycaprolactone diols, 1.1'-isopropylidene-bis-(p-phenylene-oxy)-di-β-ethanol and 1.1'-isopropylidene-bis-(p-phenylene-oxy)-di-ω-ethanol. Particularly preferred of these are the diols and polyalkylene glycols, especially those having from 2 to 8 carbons atoms.

Optionally, one or more hydroxy acid and/or lactone compounds may also be utilized in the production of the carboxyl-terminated polyester blocks (A).

As suitable hydroxy acids may be mentioned those of the general formula (II)

$$HO-R^1-COOH \tag{II}$$

wherein R' is preferably a hydrocarbon group, more preferably a (cyclo)aliphatic hydrocarbon group, having from 1 to 17 carbon atoms and especially from 7 to 17 carbon atoms. As specific examples may be mentioned hydroxycaproic acid and hydroxystearic acid.

As suitable lactone compounds may be mentioned those of the general formula (III)

$$R^2 - COO \tag{III}$$

wherein R2 is a hydrocarbon group, more preferably an aliphatic hydrocarbon group, having from 2 to 10, more preferably 5 to 9, carbon atoms. As a specific example may be mentioned ε-caprolactone.

In the preparation of the carboxyl-terminated polyester blocks (A), use may also be made of derivatives of the aforementioned components such as epoxy compounds, acid chlorides, acid anhydrides and methyl diesters.

The polycondensation reaction of the above components is generally carried out at a temperature of from about 140° C. to about 300° C., preferably from about 180° C. to about 260° C., and in an inert atmosphere of, for example, nitrogen and/or carbon dioxide. The water evolved in the polycondensation reaction may be removed in a normal manner, e.g., by distillation under reduced pressure or by azeotropic distillation with the aid of an organic solvent such as toluene, xylene or mixed aromatic solvents. After termination of the polycondensation, these solvents may optionally be removed from the polyester resin by distillation.

The polycondensation mixture may optionally contain an esterification catalyst, for example, sulfuric acid, p-toluene sulfonic acid, benzene sulfonic acid, naphthalene sulfonic acid, a sulfonic acid cation exchanger or a metal compound such as dibutyltin dilaurate or lead acetate.

The polycondensation reaction is continued until the polyester resin has the desired acid number, preferably from about 10 to about 140, and more preferably from about 20 to about 110. The hydroxyl number of the resulting polyester resin preferably should also not be higher than about 2, and more preferably from 0 to about 0.8. The acid number and hydroxyl number are expressed in mg KOH per g of polyester resin. Further, the polyester resin should have a number average molecular weight (Mn) of from about 800 to about 10000, more preferably from about 10,000 to about 6000.

Epoxy resins suitable for use in the present block copolymers may be solid or liquid, with an epoxy functionality of from about 1.5 to about 2.5 and an epoxy equivalent weight of from about 100 to about 2000.

Examples of such suitable epoxy resins are detailed in the previously incorporated references, and include glycidyl group-containing resins such as polyacrylic resins, polyesters, polyethers or polyurethanes which all contain one or more glycidyl groups per molecule. Use may also be made of mixtures of these epoxy resins. Optionally, the epoxy resin may be used as a solution in a suitable solvent.

Preferred epoxy resins are those of the general formula (IV)

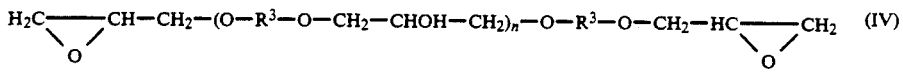

wherein $R^3$ represents an aliphatic, cycloaliphatic or aromatic group, preferably containing from 2 to about 18 carbon atoms, and n is a number from 0 to 50, preferably 0 to about 10. Adducts of these epoxy resins with (cyclo)aliphatic or heterocyclic diamines, preferably a di-secondary amine such as piperazine, are also suitable.

Examples of these preferred epoxy resins include the glycidyl ethers of, for example, ethylene glycol, diethylene glycol, triethylene glycol, 1,2-propylene glycol, 1,3-propylene glycol, 1,5-pentane diol, bis-(4-hydroxycyclohexyl)-2,2-propane, 4,4'-dihydroxybenzophenone, bis-(4-hydroxyphenyl)methane, bis-(4-hydroxyphenyl)-1,1'-ethane, bis-(4-hydroxyphenyl)-1,1-isobutane and 1,5-dihydroxynaphthalene.

In more preferred aspects, the epoxy resin has an epoxy functionality of from about 1.8 to about 2.2, an epoxy equivalent weight of from about 100 to about 700, most preferably from about 150 to about 500, and an Mn of from about 150 to about 1250.

The block copolymer may be prepared in any convenient manner by reaction of the carboxyl-terminated polyester resin with the epoxy resin. The block copolymer may optionally be prepared by using two or more carboxylic polyester and/or epoxy resins.

A suitable procedure for producing the block copolymers comprises the stepwise addition of the epoxy resin(s) to a solution of the polyester resin(s) and heating the mixture to a temperature generally in the range of from about 85° C. to about 195° C., preferably from about 100° C. to about 180° C. The reaction mixture may, if required, be made to contain a catalyst known in itself, for instance, triphenyl phosphine, benzyl triphenyl phosphonium chloride, benzyl trimethyl ammonium methoxide, a tertiary amine such as benzyl dimethylamine, or a metal compound such as zirconium octoate. A preferred solvent for the polyester resin and resulting block copolymer is an aromatic hydrocarbon such as toluene, xylene or a mixture of aromatic hydrocarbons having a boiling point of, for example, about 140° C. to about 180° C. To the resulting block copolymer obtained on the conclusion of the reaction may be added a polar solvent such as isophorone, methylethyl ketone, diacetone alcohol, the ethyl ether of ethylene glycol and the ethyl ether of ethylene glycol acetate.

The weight ratio of the carboxyl-terminated polyester resin (A) to the epoxy resin (B) is generally chosen so that, at the start of the reaction to form the block copolymer, the reaction mixture contains from 0.5 to 2.0, preferably from 0.7 to 1.3, moles of epoxy of the epoxy resin per mole of carboxyl of the polyester resin. In this manner, a block copolymer having carboxyl and/or epoxy end groups is obtained.

The most preferred block copolymer is built up of from 3 to 11 blocks (A) and 2 to 10 blocks (B), or from 2 to 10 blocks (A) and 3 to 11 blocks (B).

The number average molecular weight of the resulting block copolymer is preferably from about 30,000 to about 80,000, and more preferably from about 5000 to about 30000. The acid number of the block copolymer is preferably not higher than about 23, and more preferably in the range of from 0 to about 15.

Further details of the block copolymer can be had by reference to previously incorporated EP-B-0111986 and European Patent Application No. 89201350.9.

The coating composition of the first coating layer typically contains (but need not contain) a curing agent for the hydroxyl groups of the block copolymer, which are the result of the reaction between the carboxyl of the polyester and the epoxy group. Suitable curing agents are blocked or non-blocked isocyanurate compounds or blocked or non-blocked aliphatic, cycloaliphatic or aromatic di-, tri- or polyvalent isocyanates, specific examples of which are listed in previously incorporated EP-B-0111986 (see page 3, lines 39–52). For blocking the isocyanate or isocyanurate compound, use may be made of any well-known blocking agent.

Instead of or in addition to the isocyanate and isocyanurate curing agents, other suitable blocked and unblocked curing agents such as the N-methyloyl groups- and/or N-methyloyl ether groups-containing aminoplasts and phenol resins, as mentioned in previously incorporated EP-B-0111986 (see page 3, lines 53–65), may also be utilized.

The curing agent should be present in the coating composition in an amount such that the molar ratio of the reactive groups of the curing agent to that of the hydroxyl groups of the block copolymer is in the range of from 0.1 to about 1.7, preferably from about 0.2 to about 1.5.

Optionally, the coating composition of the first coating layer may contain solid powdered polymers and pigments such as mentioned in previously incorporated EP-B-0111986 (see page 4, lines 4–28), and also the usual adjuvants and additives, for example, pigment dispersing agents, antisag agents, rheology control agents, corrosion inhibiting compounds (e.g., metallic zinc or metallic aluminum), plasticizers, gloss agents and accelerators such as p-toluene sulfonic acid and blocked products of such accelerators.

As examples of suitable pigments may be mentioned the usual types of acid, neutral or basic pigments which may be organic or inorganic. The pigments may be optionally treated to modify their properties. As specific examples may be mentioned titanium dioxide, red iron oxide, lead chromate, carbon black and phthalocyanine pigments. The term pigments as used herein also refers to metallic pigments such as aluminum and stainless steel. The weight ratio of pigment to block copolymer and curing agent is generally in the range of about 0.05 to 19, the higher ratios being used for generally metal-rich compositions, which are weldable if they contain metal as pigment or corrosion inhibiting compound.

The coating composition of the first coating layer may be applied to a substrate in any convenient manner, such as by roller coating or (electrostatic) spraying, and may be cured or baked in the usual manner. For example, in a coil coating process baking is to be carried out at an applied final temperature of the substrate of about 200° C. to about 280° C., which temperature is normally reached by contacting the coated substrate for a short time (e.g., 10 to 90 seconds) with air or combustion gases at a temperature of about 250° C. to about 400° C. Application and baking conditions during coil coating are known to one skilled in the art and need not be further described here. Suitable baking temperatures for other fields of application may, for example, range from about 120° C. to about 210° C.

The at least one flexible subsequent coating layer to be applied over the first coating layer is characterized by performance characteristics such as high flexibility as measured by the T-bend test and the Erichsen impact test, a glass transition temperature in the range of about 30° C. to about 70° C., adhesion capability relative to the first coating layer, stone chipping resistance and leveling properties. One skilled in the art can select a coating material which will perform well in combination with the above-described first coating layer. Coating materials known to perform well as the second coating layer include polyurethane coatings based upon polyester polyols crosslinked using a polyisocyanate (such as commercially available under the trade designation PZ 2000 from Akzo Coatings) and polyester polyols, having a relatively low Mn (e.g., about 2,000 to about 10,000) and a functionality of about 2, crosslinked using a melamine.

The flexible subsequent coating layer material may also contain adjuvants and additives of the type previously discussed for use in the first coating layer.

The coating composition of the at least one flexible subsequent coating layer may be applied, as with the coating composition of the first coating layer, in any convenient manner, such as by roller coating or (electrostatic) spraying, and cured or baked in the usual manner such as, for example, as described above.

It is preferred that the first coating layer be applied to a dry layer thickness of up to about 15 μm, more preferably from about 3 μm to about 10 μm, and the at least one flexible subsequent coating layer to a dry layer thickness up to about 30 μm, more preferably from about 12 μm to about 25 μm. The total primer dry layer thickness should preferably range from about 15 μm to about 45 μm, more preferably from about 20 μm to about 30 μm.

The resulting preprimed metal substrate can then be utilized in formed metal applications. The forming of the preprimed metal substrate may be accomplished by any well-known means, such as by bending, stamping, profiling and drawing.

The preprimed metal substrate prepared according to the present invention finds use in metallic construction such as buildings, appliances, metallic furniture and particularly in the automotive field, where properties such as high corrosion protection, excellent stone chipping resistance, and ease of deep draw shape formation are especially important.

The foregoing general discussion of this invention will be further exemplified by the following specific examples offered by way of illustration and not limitation of the above-described invention.

EXAMPLES 1-10 and COMPARATIVE EXAMPLES C11 and C12

Preparation of Polyester/Epoxy Block Copolymer for Examples 1-10

In Examples 1-10 use was made of carboxyl-terminated polyester resins (A-G) obtained by the polycondensation of the components in the amounts (parts by weight) as listed below in Table I.

The polycondensation was carried out at a temperature of about 240° C. to about 260° C. in the presence of 3% by weight of xylene (based upon the total polycondensation mixture). The polycondensation was continued until the polyester had the desired acid number. Esterification catalysts used were dibutyltin oxide (polyesters A, B, D and F) and tributyltin oxide (polyesters C and E). No esterification catalyst was used in the preparation of polyester G.

The resulting polyester resins all had an hydroxyl number of 0 and showed no crystallinity. Table I also lists other characteristics of the so-produced polyester resins.

TABLE I

| | Polyester Resin | | | | | | |
|---|---|---|---|---|---|---|---|
| | A | B | C | D | E | F | G |
| Components | | | | | | | |
| 1,2-propane diol | 26.83 | — | — | — | — | 9.03 | — |
| 1,5-pentane diol | — | — | 37.60 | 35.25 | 33.28 | — | 10.30 |
| 1,6-hexane diol | — | 39.53 | — | — | — | 28.08 | 30.73 |
| 1,1,1-trimethylol propane | — | — | — | 0.46 | 2.25 | — | — |
| isophthalic acid | 73.07 | — | 31.15 | 64.29 | 64.47 | 62.59 | — |
| terephthalic acid | — | 60.37 | 31.15 | — | — | — | — |
| trimellitic anhydride | — | — | — | — | — | 0.21 | — |
| adipic acid | — | — | — | — | — | — | 58.97 |
| Properties | | | | | | | |
| Acid Number | 112 | 37 | 19 | 56 | 56 | 29 | 57 |
| Carboxyl Functionality | 2.0 | 2.0 | 2.0 | 2.08 | 2.48 | 2.05 | 2.0 |
| Number Average MW | 1000 | 3000 | 6000 | 2081 | 2475 | 4000 | 1358 |

The polyester/epoxy block copolymers, BC1-BC10, used in Examples 1-10 were prepared by adding one or more epoxy resins, of the types and in the amounts as set forth below in Table II, to solutions of the above polyester resins. All amounts for the epoxy resins and polyesters in Table II are expressed as parts by weight (solids).

Epoxy resin A was a diglycidyl ether of Bisphenol A with an epoxide equivalent of 170 (commercially available under the trade designation Epikote 828 from Shell Chemical). Epoxy resin B was a diglycidyl ether of Bisphenol A with an epoxide equivalent of 454 (commercially available under the trade designation Epikote 1001 and Epon 1001 from Shell Chemical). Epoxy resin C was a diglycidyl ether of 1,4-butane diol with an epoxide equivalent of 101. Epoxy resin D was an adduct of 2 moles of Epoxy resin A and 1 mole of piperazine.

The solutions of polyester resins A-F were prepared by dissolving each in 51.5 parts by weight of an aromatic hydrocarbon solvent (commercially available under the trade designation Solvesso 100 from Shell Chemical). The solution of the polyester resin G was prepared by dissolving in 40 parts by weight of this aromatic hydrocarbon solvent.

Subsequent to the addition of the epoxy resin to the polyester resin solutions, 0.1 parts by weight of benzyl diethylamine for polyester resins A-F, and 0.3 parts by weight triphenyl phosphine for polyester resin G, were added and the reaction mixtures kept at a temperature of about 150° C. until the block copolymer formed had the acid number as set forth in Table II. Also set forth in Table II are other characteristics of the so-prepared polyester/epoxy block copolymers.

TABLE II

| | Polyester/Epoxy Block Copolymers | | | | | | | | | |
|---|---|---|---|---|---|---|---|---|---|---|
| | BC1 | BC2 | BC3 | BC4 | BC5 | BC6 | BC7 | BC8 | BC9 | BC10 |
| PE Type | A | A | B | B | C | C | D | E | F | G |
| Amount | 71.67 | 77.05 | 79.83 | 76.37 | 85.64 | 92.74 | 61.60 | 58.74 | 75.75 | 60.20 |
| Epoxy A | 28.23 | 8.68 | — | — | — | 2.96 | — | — | — | — |
| Epoxy B | — | 3.86 | 20.07 | — | 14.26 | 4.21 | 38.30 | 41.16 | 24.16 | 39.80 |
| Epoxy C | — | 10.31 | — | — | — | — | — | — | — | — |
| Epoxy D | — | — | — | 33.53 | — | — | — | — | — | — |
| Properties | | | | | | | | | | |
| Acid No. | 3.0 | 4.5 | 7.0 | 1.0 | 2.0 | 4.0 | 0.5 | 0.5 | 0.4 | 0.4 |
| Carboxyl Func. | 0.32 | 0.68 | 1.54 | 0.34 | 0.71 | 1.43 | 0.11 | 0.11 | 0.13 | 0.06 |
| OH No. | 108.5 | 104.0 | 52.0 | 29.0 | 39.0 | 22.0 | 90.0 | 93.0 | 57.0 | 84.4 |
| OH Func. | 11.60 | 15.75 | 11.08 | 9.68 | 13.85 | 7.76 | 19.36 | 19.91 | 17.80 | 12.63 |
| Mn | 6000 | 8500 | 12000 | 19000 | 20000 | 20000 | 12000 | 12000 | 17500 | 8400 |

To the solutions of the polyester/epoxy block copolymers thus prepared were added ethyl ether of ethylene glycol (BC1-BC9), methoxy propanol (BC10) and the previously used aromatic hydrocarbon solvent in amounts such that solutions were obtained having a solids content of about 40% by weight of the block copolymer in a mixture of equal parts by weight of the two solvents.

Comparative Resin 11 for Comparative Example C11

Comparative Example C11 was based upon an epoxy resin (CR11) which was the diglycidyl ether of Bisphenol A with an epoxide equivalent of about 2400 to 4000 (commercially available under the trade designation Epon 1009 from Shell Chemical). A 40% solution of the epoxy resin was prepared by dissolving, at 100° C., 40 parts by weight of the epoxy resin into a solvent mixture comprising 36 parts by weight of the aforementioned aromatic solvent and 24 parts by weight methoxypropanol.

First Coating Layer Compositions (Primer First Coating Layer) for Examples 1-10 and Comparative Examples C11 and C12

To obtain the first coating layer compositions used in Examples 1-10 and Comparative Example 11, the correspondingly numbered polyester/epoxy block copolymers and comparative resin, in the amounts as set forth in Table III (in parts by weight solids), and in the form of the previously described solutions, were homogeneously mixed with the other components in the amounts (in parts by weight) as listed in Table III. The crosslinking agent was the adduct of hexamethylene diisocyanate and 1 mole of water (commercially available under the trade designation Desmodur N from Bayer AG), blocked with methylethylketoxime, in methoxypropanol acetate (NVM 75%).

The first coating layer composition for Comparative Example 12 (CP12) was a standard coil coating currently used in the precoating industry as a primer for steel or zinc coated steel. This primer is based upon an urea formol epoxy precondensate, which is commercially available under the trade designation 7E1328 from Akzo Coatings France.

The ten primer first coating layers (P1-P10) based upon the polyester/epoxy block copolymers and two comparative primers (CP11 and CP12) were applied as the first coating layer onto a hot dip galvanized steel substrate (commercially available under the trade designation Extragal Z100 from Sollac). After cleaning and surface treatment of the metal substrate using alkaline degreasing chromotation (Granodine 93CF from CFPI chromic zinc), the primers were applied by roller coating, then cured at a Pic Maximum Temperature of 242° C. with a dwell time of 30''. Each dry film thickness was about 5 μm.

Over this primer first coating layer was applied a primer second coating layer of a polyurethane based coating (a polyester polyol crosslinked used an isocyanate) commercially available under the trade designation PZ2000 from Akzo Coatings. This primer second coating layer was applied by roller coating over the dried primer first coating layer, then curing at a Pic Maximum Temperature of 242° C. with a dwell time of 35''. The dry film thickness of the second primer layer was about 20 μm.

The resulting coated metal panels were evaluated for the performance level of the flexibility and capability of deep draw, as exemplified by the following tests:
(1) the Erichsen indentation test—DIN 53 156;
(2) the reverse impact test—ASTM D 2794-1982 (expressed in in-lb);
(3) the double-draw test—RNUR (Régie Nationale des Unines Renault) D.111 700;

TABLE III

| First Coating Layer | Resin Type | Resin Amount | Titan. Diox. | Stront. Chrom. | Silica | Cross. Agent | Meth. Prop. | Arom. Solv. |
|---|---|---|---|---|---|---|---|---|
| P1 | BC1 | 42.7 | 15.9 | 2.0 | 2.5 | 3.7 | 13.3 | 19.9 |
| P2 | BC2 | 42.7 | 15.9 | 2.0 | 2.5 | 3.7 | 13.3 | 19.9 |
| P3 | BC3 | 42.7 | 15.9 | 2.0 | 2.5 | 3.7 | 13.3 | 19.9 |
| P4 | BC4 | 42.7 | 15.9 | 2.0 | 2.5 | 3.7 | 13.3 | 19.9 |
| P5 | BC5 | 42.7 | 15.9 | 2.0 | 2.5 | 3.7 | 13.3 | 19.9 |
| P6 | BC6 | 42.7 | 15.9 | 2.0 | 2.5 | 3.7 | 13.3 | 19.9 |
| P7 | BC7 | 42.7 | 15.9 | 2.0 | 2.5 | 3.7 | 13.3 | 19.9 |
| P8 | BC8 | 42.7 | 15.9 | 2.0 | 2.5 | 3.7 | 13.3 | 19.9 |
| P9 | BC9 | 42.7 | 15.9 | 2.0 | 2.5 | 3.7 | 13.3 | 19.9 |
| P10 | BC10 | 43.9 | 19.2 | 2.4 | 3.0 | 3.4 | 11.3 | 16.9 |
| CP11 | CR11 | 42.7 | 15.9 | 2.0 | 2.5 | 3.7 | 13.3 | 19.9 |

(4) the T-Bend test—European Coil Coating Association (expressed in ratings T0, T1, T2, etc.—a value of 0 denotes excellent flexibility and a value of 4 acceptable flexibility); and (5) the stone chipping resistance—RNUR D.24 1702.

Corrosion resistance was evaluated by the salt spray test in accordance with ASTM B 117, with results reported in mm delamination on the scribe. Corrosion resistance after deformation was also evaluated by the following procedure: the coated panels were submitted to a 20% uniaxial stretching, then a 25 mm diameter hole punched in the middle. The resulting panels were then exposed according to the 3-C test of RNUR D.17 1686. The results are expressed in mm delamination obtained on the edges of the hole after 5 cycles.

The results of the testing are presented in Table IV below.

TABLE IV

| EX | First Coating Layer | Erich. Indent. | Rever. Impact | Doub. Draw | T-Bend | Stone Chip | Corr. Res. | Corr. Res. After Deform. |
|---|---|---|---|---|---|---|---|---|
| 1 | P1 | 9.0 | 160 | Pass | 0.5 | 2 | 2 | 1 |
| 2 | P2 | 9.2 | 160 | Pass | 0.5 | 2 | 1.5 | 1.5 |
| 3 | P3 | 9.6 | 160 | Pass | 0.5 | 2 | 2 | 2 |
| 4 | P4 | 9.4 | 160 | Pass | 0.5 | 1.5 | 1 | 1 |
| 5 | P5 | 9.8 | 160 | Pass | 0.5 | 2 | 2 | 2.5 |
| 6 | P6 | 10.0 | 160 | Pass | 0.5 | 2 | 1 | 2 |
| 7 | P7 | 9.9 | 160 | Pass | 0.5 | 2 | 1 | 1 |
| 8 | P8 | 9.2 | 160 | Pass | 0.5 | 2 | 1.5 | 1.5 |
| 9 | P9 | 9.5 | 160 | Pass | 0.5 | 2 | 2 | 2 |
| 10 | P10 | 10.0 | 160 | Pass | 0 | 2 | <1 | <1 |
| C11 | CP11 | 8.7 | 160 | Fail | 1.5 | 3.5 | 7 | 4 |
| C12 | CP12 | 8.7 | 140 | Fail | 1.5 | 3.5 | 8 | 5 |

The results of testing, as shown in Table IV, demonstrate that preprimed metal surfaces prepared using the coating materials of the present invention (and particularly having a first coating layer composition of the type disclosed herein) can be double drawn (formed) in a manner not possible using the present commonly used metal primers. In addition, the corrosion resistance shows an unexpected improvement when the preprimed metal surfaces of the present invention are compared with conventional preprimed surfaces. After deformation, the preprimed metal surfaces of the present invention also showed substantially better corrosion resistance than the metal surfaces preprimed with conventional primers. The flexibility and stone chip resistance of the preprimed metal surfaces of the present invention are significantly better than the flexibility and stone chip resistance of conventionally primed metal surfaces.

EXAMPLE 13 and COMPARATIVE EXAMPLE C14

Example 7 and Comparative Example C12 were repeated in their entirety, except that a particular polyester based coating, as described below, was applied as the second primer layer in place of the polyurethane based coating described above.

The polyester resin for the polyester based coating was prepared by charging, to a suitable vessel maintained under nitrogen atmosphere, 24.8 parts by weight polypropylene glycol, 12.4 parts by weight neopentyl glycol and 0.05 parts by weight dibutyltin oxide as catalyst. The temperature of the contents of the vessel was raised to 110° C., then 22.1 parts by weight adipic acid, 39.8 parts by weight isophthalic acid and 0.9 parts by weight trimellitic acid were further charged. The temperature was then raised to 220° C. and maintained until the acid value fell below 30.

The reaction water was then removed by azeotropic distillation with an aromatic hydrocarbon solvent (commercially available under the trade designation Solvesso 100 from Shell) until the acid value fell below 3, at which point the mixture was cooled to about 150° C. Finally, 33.4 parts by weight aromatic hydrocarbon solvent (commercially available under the trade designation Solvesso 150 from Shell) and 22.9 parts by weight methoxypropanol acetate were added to bring the solids content of the resulting solution to 60.1%.

A grey polyester based coating was prepared from the above polyester resin solution by mixing the following components in the amounts as set forth below in Table V (numbers are in parts by weight):

TABLE V

| Components | Parts | Components | Parts |
|---|---|---|---|
| Polyester resin (solids) | 46.0 | Carbon black | 1.0 |
| Crosslinker | 6.4 | Titanium dioxide | 32.7 |
| Catalyst | 1.0 | Solvent | 4.0 |
| Flow agent | 0.1 | Methoxy propanol acetate | 2.5 |
| | | Butyl acetate | 6.3 |

The crosslinker was a melamine resin commercially available under the trade designation Cymel 303 from American Cyanamid. The catalyst was a blocked acid catalyst commercially available under the trade designation Cycat 405 from American Cyanamid. The flow agent was a silicone additive commercially available under the trade designation Silicone L.75 from Union Carbide Corp. The solvent was a mixed aromatic solvent commercially available under the trade designation Solvesso 200 from Shell Chemical.

The resulting coated metal panels were evaluated in the manner of Examples 1-10 and Comparative Examples C11 and C12. The results are presented below in Table VI.

TABLE VI

| EX | Primer | Erich Indent. | Rever. Impact | Doub. Draw | T-Bend | Stone Chip | Corr. Res. | Corr. Res. After Deform. |
|---|---|---|---|---|---|---|---|---|
| 13 | P7 | 10.2 | 120 | Pass- | 1.5 | 1.5 | 0 | 1 |
| C14 | CP12 | 8.0 | 80 | Fail | 2.5 | 4 | 4 | 4 |

Again, the results of testing, as shown in Table VI, demonstrate that the preprimed metal surface prepared using the coating materials and method of the present invention permitted formation (double draw) not possible using a conventional priming material as a prepriming coating. In addition, corrosion resistance is substantially improved, as is stone chip resistance, by use of the present invention.

EXAMPLE 15

Example 7 was repeated in its entirety except that, as the metal substrate, was utilized an electrogalvanized steel (70/70 g/m², commercially available from Sollac). The results of the testing are presented below in Table VII.

TABLE VII

| EX | Primer | Erich. Indent. | Rever. Impact | Doub. Draw | T-Bend | Stone Chip | Corr. Res. | Corr. Res. After Deform. |
|---|---|---|---|---|---|---|---|---|
| 15 | P7 | 10.0 | 160 | Pass | 0.5 | 1.5 | 1 | 1 |

The results shown in Table VII indicate that the prepriming composition and method of the present invention provided the improved performance previously discussed whether the metal surface being preprimed is hot dipped galvanized steel or electrogalvanized steel.

Many modifications and variations may be made to the embodiments specifically mentioned here without substantially departing from the concept of the present invention. Accordingly, it should be clearly understood that the preferred embodiments of the invention described herein are exemplary only, and not intended as a limitation on the scope of the invention as defined in the following claims.

We claim:

1. A preprimed metal substrate comprising a metal substrate coated with a primer, wherein the primer comprises:
   (1) a first coating layer applied onto the metal substrate, the first coating layer comprising a coating composition based upon a hydroxyl group-containing block copolymer, as a binder, built up from
      (A) one or more blocks of a carboxyl-terminated polyester resin, and
      (B) one or more blocks of an epoxy resin; and
   (2) at least one flexible subsequent coating layer applied onto the first coating layer,
wherein said at least one flexible subsequent-coating layer has a glass transition temperature ranging from about 30° C. to about 70° C.

2. The preprimed metal substrate of claim 1, wherein the carboxyl-terminated polyester resin comprises the polycondensation product of one or more dicarboxylic acids and one or more difunctional hydroxy compounds, wherein the dicarboxylic acid is selected from the group consisting of aromatic dicarboxylic acids, aliphatic dicarboxylic acids and mixtures thereof.

3. The preprimed metal substrate of claim 1, wherein the carboxyl-terminated polyester resin has an acid number of from about 10 to about 140, an hydroxyl number not higher than about 2 and a number average molecular weight of from about 800 to about 10000.

4. The preprimed metal substrate of claim 1, wherein the epoxy resin has an epoxy functionality ranging from about 1.5 to about 2.5, and an epoxy equivalent weight of from about 100 to about 2000.

5. The preprimed metal substrate of claim 1, wherein the hydroxyl group-containing block copolymer is built up from 3 to 11 blocks (A) and 2 to 10 blocks (B).

6. The preprimed metal substrate of claim 1, wherein the hydroxyl group-containing block copolymer has a number average molecular weight of from about 3000 to about 80000, and an acid number not higher than about 23.

7. The preprimed metal substrate of claim 1, wherein the first coating layer further contains a crosslinking agent for the hydroxyl group of the hydroxyl groups-containing block copolymer.

8. The preprimed metal substrate of claim 1, wherein the first coating layer is pigmented.

9. The preprimed metal substrate of claim 1, wherein the metal substrate comprises a metal sheet.

10. The preprimed metal substrate of claim 1, wherein the first coating layer has a dry layer thickness up to about 15 $\mu$m, the at least one flexible subsequent coating layer has a dry layer thickness up to about 30 $\mu$m, and the total primer dry layer thickness ranges from about 15 $\mu$m to about 45 $\mu$m.

11. The preprimed metal substrate of claim 1, wherein the hydroxyl group-containing block copolymer is built up from 2 to 10 blocks (A) and 3 to 11 blocks (B).

12. The preprimed metal substrate of claim 2, wherein the dicarboxylic acid is selected from aromatic dicarboxylic acids.

13. The preprimed metal substrate of claim 12, wherein the aromatic dicarboxylic acids is selected from the group consisting of terephthalic acid and isophthalic acid.

14. The preprimed metal substrate of claim 4, wherein the epoxy resin has an epoxy functionality of from about 1.8 to about 2.2, an epoxy equivalent weight of from about 100 to about 700, and a number average molecular weight of from about 150 to about 1250.

15. The preprimed metal substrate of claim 4, wherein the hydroxyl group-containing block copolymer has a number average molecular weight of from about 5000 to about 30000, and an acid number in the range of from 0 to about 15.

16. The preprimed metal substrate of claim 10, wherein the first coating layer has a dry layer thickness of from about 3 $\mu$m to about 10 $\mu$m, the at least one flexible subsequent coating layer has a dry layer thickness of from about 12 $\mu$m to about 25 $\mu$m, and the total primer dry layer thickness ranges from about 20 $\mu$m to about 30 $\mu$m.

17. A preprimed metal substrate comprising a metal substrate coated with a primer, wherein the primer comprises:
   (1) a first coating layer applied onto the metal substrate, the first coating layer comprising a coating composition based upon a hydroxyl group-containing block copolymer, as a binder, built up from
      (A) one or more blocks of a carboxyl-terminated polyester resin, and
      (B) one or more blocks of an epoxy resin; and
   (2) at least one flexible subsequent coating layer applied onto the first coating layer, wherein the carboxyl-terminated polyester resin has an acid number of from about 10 to about 140, an hydroxyl number not higher than about 2 and a number average molecular weight of from about 800 to about 10,000, and wherein the at least one flexible subsequent coating layer comprises a coating selected from the group consisting of polyester polyols crosslinked with a polyisocyanate and polyester polyols crosslinked with a melamine.

18. A method of prepriming a metal substrate comprising applying a primer layer thereon, wherein the primer layer comprises:
  (1) a first coating layer applied onto the metal substrate, the first coating layer comprising a coating composition based upon a hydroxyl group-containing block copolymer, as a binder, built up from
    (A) one or more blocks of a carboxyl-terminated polyester resin, and
    (B) one or more blocks of an epoxy resin; and
  (2) at least one flexible subsequent coating layer applied onto the first coating layer,
wherein said at least one flexible subsequent coating layer has a glass transition temperature ranging from about 30° C. to about 70° C.

19. The method of claim 18, where the carboxyl-terminated polyester resin comprises the polycondensation product of one or more dicarboxylic acids and one or more difunctional hydroxy compounds, wherein the dicarboxylic acid is selected from the group consisting of aromatic dicarboxylic acids, aliphatic dicarboxylic acids and mixtures thereof.

20. The method of claim 18, wherein the carboxyl-terminated polyester resin has an acid number of from about 10 to about 140, an hydroxyl number not higher than about 2 and a number average molecular weight of from about 800 to about 10,000.

21. The method of claim 18, wherein the epoxy resin has an epoxy functionality ranging from about 1.5 to about 2.5, and an epoxy equivalent weight of from about 100 to about 2000.

22. The method of claim 18, wherein the hydroxyl group-containing block copolymer is built up from 3 to 11 blocks (A) and 2 to 10 blocks (B), or from 2 to 10 blocks (A) and 3 to 11 blocks (B).

23. The method of claim 18, wherein the hydroxyl group-containing block copolymer has a number average molecular weight of from about 3000 to about 80000, and an acid number not higher than about 23.

24. The method of claim 18, wherein the first coating layer further contains a crosslinking agent for the hydroxyl groups of the hydroxyl group-containing block copolymer.

25. The method of claim 18, wherein the first coating layer is pigmented.

26. The method of claim 18, wherein the metal substrate comprises a metal sheet.

27. The method of claim 18, wherein the first coating layer has a dry layer thickness up to about 15 μm, the at least one flexible subsequent coating layer has a dry layer thickness up to about 30 μm, and the total primer dry layer thickness ranges from about 15 μm to about 45 μm.

28. The method of claim 18, wherein the so-preprimed metal substrate is suitable for forming.

29. The method of claim 27, wherein the first coating layer has a dry layer thickness of from about 3 μm to about 10 μm, the at least one flexible subsequent coating layer has a dry layer thickness of from about 12 μm to about 25 μm, and the total primer dry layer thickness ranges from about 20 μm to about 30 μm.

30. A method of prepriming a metal substrate comprising applying a primer layer thereon, wherein the primer layer comprises:
  (1) a first coating layer applied onto the metal substrate, the first coating layer comprising a coating composition based upon a hydroxyl group-containing block copolymer, as a binder, built up from
    (A) one or more blocks of a carboxyl-terminated polyester resin, and
    (B) one or more blocks of an epoxy resin; and
  (2) at least one flexible subsequent coating layer applied onto the first coating layer,
wherein said at least one flexible subsequent coating layer comprises a coating selected from the group consisting of polyester polyols crosslinked using a polyisocyanate or a melamine, and has a glass transition temperature ranging from about 30° C. to about 70° C.

31. A method of preparing a preprimed metal substrate suitable for formed metal applications comprising applying a primer layer thereon, whereon the primer layer comprises:
  (1) a first coating layer applied onto the metal substrate, the first coating layer comprising a coating composition based upon, as a binder, a hydroxyl group-containing block copolymer built up from
    (A) one or more blocks of an epoxy resin; and
    (B) one or more blocks of an epoxy resin; and
  (2) at least one flexible subsequent coating layer applied onto the first coating layer.

* * * * *

UNITED STATES PATENT AND TRADEMARK OFFICE
CERTIFICATE OF CORRECTION

PATENT NO. : 5,229,214
DATED : July 20, 1993
INVENTOR(S) : Maze, E. G. et al

It is certified that error appears in the above-indentified patent and that said Letters Patent is hereby corrected as shown below:

Column 3, lines 66 and 67, "1.1'" should read -- 1,1' --;

Column 4, line 11, "R'" should read -- $R^1$ --;

Column 4, line 59, "100000" should read -- 10,000 --;

Column 4, line 60, "10,000" should read -- 1000 --;

Column 5, line 67, "30,000" should read -- 3000 --;

Column 6, line 1 "30000" should read -- 30,000 --

Column 14, line 11, claim 7, "groups-" should read -- group- --;

Column 14, line 36, claim 13, "acids" should read -- acid --;

Column 14, line 67, claim 17, please begin a new line with "wherein".

UNITED STATES PATENT AND TRADEMARK OFFICE
CERTIFICATE OF CORRECTION

PATENT NO. : 5,229,214
DATED : July 20, 1993
INVENTOR(S) : Maze, E. G. et al

It is certified that error appears in the above-indentified patent and that said Letters Patent is hereby corrected as shown below:

Column 16, line 46, claim 31, after "of", delete "an epoxy resin;" and insert -- a carboxyl-terminated polyester resin; --.

Signed and Sealed this

Twenty-seventh Day of September, 1994

Attest:

BRUCE LEHMAN

Attesting Officer      Commissioner of Patents and Trademarks